(12) United States Patent
Sasak et al.

(10) Patent No.: US 12,129,965 B2
(45) Date of Patent: Oct. 29, 2024

(54) LUBRICATION ATOMIZATION FOR A GAS CYLINDER ARRANGEMENT

(71) Applicant: Barnes Group Inc., Bristol, CT (US)

(72) Inventors: Russell D. Sasak, Highland Heights, OH (US); Richard W. Sasak, Highland Heights, OH (US)

(73) Assignee: BARNES GROUP INC., Bristol, CT (US)

( * ) Notice: Subject to any disclaimer, the term of this patent is extended or adjusted under 35 U.S.C. 154(b) by 0 days.

(21) Appl. No.: 18/282,840

(22) PCT Filed: Mar. 18, 2022

(86) PCT No.: PCT/US2022/020968
§ 371 (c)(1),
(2) Date: Sep. 19, 2023

(87) PCT Pub. No.: WO2022/198059
PCT Pub. Date: Sep. 22, 2022

(65) Prior Publication Data
US 2024/0167624 A1 May 23, 2024

Related U.S. Application Data

(60) Provisional application No. 63/163,483, filed on Mar. 19, 2021.

(51) Int. Cl.
*F16N 29/02* (2006.01)
*F16N 7/34* (2006.01)
*F16N 7/38* (2006.01)

(52) U.S. Cl.
CPC ............... *F16N 29/02* (2013.01); *F16N 7/34* (2013.01); *F16N 7/385* (2013.01)

(58) Field of Classification Search
CPC ..... F16N 7/30; F16N 7/32; F16N 7/34; F16N 7/385; F16N 29/02; F16J 10/02
USPC .......................................................... 184/6.1
See application file for complete search history.

(56) References Cited

U.S. PATENT DOCUMENTS

| | | | |
|---|---|---|---|
| 4,688,775 A | 8/1987 | Kadis | |
| 6,022,004 A | 2/2000 | Kelm et al. | |
| 2002/0014150 A1 | 2/2002 | Shirakawa et al. | |
| 2007/0151699 A1 | 7/2007 | Lanterman et al. | |

FOREIGN PATENT DOCUMENTS

JP 2018-065187 4/2018

OTHER PUBLICATIONS

International Search Report of the International Searching Authority for International Application No. PCT/US2022/020968 dated Jun. 27, 2022.
Written Opinion of the International Searching Authority for International Application No. PCT/US2022/020968 dated Jun. 27, 2022.

*Primary Examiner* — Henry Y Liu
(74) *Attorney, Agent, or Firm* — CANTOR COLBURN LLP

(57) ABSTRACT

A manifold system that includes a cylinder assembly formed at least partially or fully of a manifold housing; a fluid reservoir; a gas cylinder assembly that is fluidly connected to the fluid reservoir by a fluid supply conduit fluidly; and wherein atomized non-solid lubricant that flows into a cylinder sleeve of the gas cylinder assembly is used to at least partially or fully lubricate an inner surface of an interior chamber of the cylinder sleeve during the operation of the gas cylinder assembly.

54 Claims, 7 Drawing Sheets

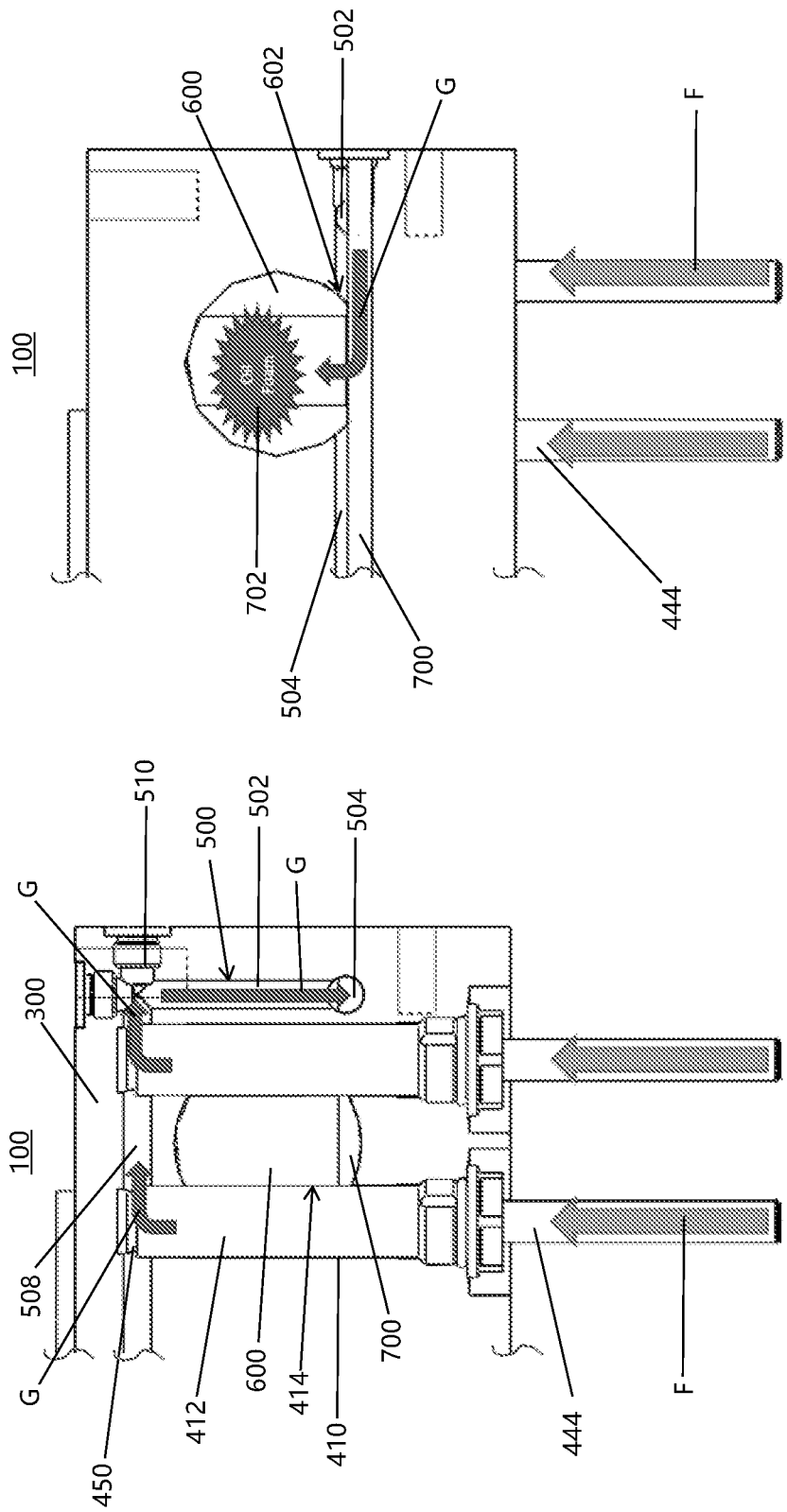

LUBRICATION ATOMIZATION FOR A GAS CYLINDER ARRANGEMENT

The present disclosure claims priority on U.S. Provisional Application Ser. No. 63/163,483 filed Mar. 19, 2021, which is fully incorporated herein by reference.

The present disclosure relates generally to gas cylinders, particularly to a gas cylinder assembly for use in pressing tools, and more particularly to a gas cylinder assembly for use in pressing tools that have a cylinder lubrication feature that at least partially or fully lubricates an inner surface of a cylinder of the gas cylinder assembly with atomized lubricant.

BACKGROUND OF DISCLOSURE

Gas cylinder assemblies have come to be widely used throughout industry. One example of use is in pressing or cushion assemblies intended for forming sheet-metal parts. Examples of such pressing are disclosed in U.S. Pat. Nos. 2,815,254; 4,005,763; 4,257,254; 4,342,448; and 11,110,506, which are fully incorporated by reference herein.

During operation of the pressing or cushion assemblies, one or more of the components are lubricated to enhance the service life and reliability of the pressing or cushion assembly. For example, nitrogen manifold systems are designed with gas cylinder assemblies which dynamically cycle pistons. The pistons have high pressure seals axially sliding in a metal sleeve. It has been historically shown that oil must be present on the high-pressure seals to allow for millions of cycles or strokes without failure of the high-pressure seals.

When the nitrogen manifold systems are mounted on the lower section of the pressing or cushion assemblies, any oil present in the gas cylinder assembly will collect at the lowest point in the gas cylinder assembly below the piston and sleeves. As the piston is moved toward the top of the cylinder sleeve of the gas cylinder, the piston forces nitrogen around the oil and cylinder sleeve. The nitrogen flow creates turbulence and moves the oil with the nitrogen to lubricate the cylinder sleeve. This setup for lower mounted nitrogen manifolds allows the piston to cycle for millions of strokes without degradation of performance.

SUMMARY OF THE DISCLOSURE

The present disclosure provides a new and improved method and apparatus for lubricating components of a cylinder assembly that can be used in a manifold of a press or cushion assembly. However, it will be appreciated that the new and improved method and apparatus for lubricating components of a cylinder assembly can be used in other arrangements that include gas springs and/or gas cylinder assemblies.

The present disclosure relates to an improved lubrication system for an inverted or an upper mounting manifold setup wherein a mixture of atomized non-solid lubricant and gas is used to lubricant a gas cylinder assembly. As can be appreciated, a standard gas manifold (lower gas manifold) setup can also be used with the improved lubrication system. The atomization of the non-solid lubricant lubricates the high-pressure dynamic seals in the cylinders of the cylinder assembly to allow for an enhanced number (e.g., millions, etc.) of cycles without performance degradation of the cylinder assembly. The manifold in accordance with the present disclosure can be used in stamping presses to make parts in the automotive industry, manufacturing industry, medical field, etc.

During operation of the press or cushion assembly, the press or cushion assembly moves between an open position and closed position. During such operation, a piston on one or more cylinder assemblies moves axially in a cylinder sleeve of each of the cylinder assemblies thereby creating a variable pressurized volume within each of the cylinder sleeves for a fluid. The diameter, length, and material of each of the cylinder sleeves are non-limiting. The cross-sectional shape or diameter, and the length of the interior chamber of each of the cylinder sleeves are non-limiting. The size, shape, length, and material of the piston are non-limiting other than the piston is configured to move within the interior chamber of the one or more cylinder sleeves. Each piston can optionally include a piston guide to guide the movement of the piston in the interior chamber of the cylinder sleeve. The size, shape, configuration, and material of the piston guide (when used) are non-limiting. Each of the pistons generally includes a sealing arrangement (e.g., elastomeric seal rings, flaps, etc.) to inhibit or prevent fluid from escaping the front-end of the interior chamber of the cylinder sleeve and/or other or additional regions of the interior chamber during the movement of the piston within the interior chamber of the cylinder sleeve. The front end of each of the pistons generally includes a piston rod that extends outwardly from the front end of the cylinder sleeve. Each of the cylinder assemblies can optionally include other components (e.g., gaskets, bushings, sensors, etc.). The number of strokes per minute of the piston moving between the between retracted and extended piston positions within the interior chamber of each of the cylinder sleeves is non-limiting. In one non-limiting arrangement, the piston moves 1-100 strokes/minute (and all values and ranges therebetween). The fluid flowing into and out of the cylinder sleeve includes a gas and a lubricant. A portion of all of the lubricant in the fluid that flows into and out of the cylinder sleeve is atomized lubricant. The gas can be a nitrogen gas; however, other or additional gasses can be used. The lubricant is a non-solid lubricant that is in liquid form at a temperature of at least as low as 0° C. In one non-limiting arrangement, the non-solid lubricant has a viscosity of no more than 80 cSt @ 40° C. and more than 25 cSt @ 100° C. (ASTM D 445). One non-limiting example, the non-solid lubricant is a T2 oil; however, other or additional non-solid lubricants can be used.

As the one or more cylinder assemblies move to an extended piston position, the variable pressurized volume increases within each of the cylinder sleeves, and a flow of fluid moves from a fluid reservoir into each of the cylinder sleeves. The fluid that enters the cylinder sleeve includes atomized particles of lubricant wherein at least a portion or all of the atomization of the lubricant and the combining of the atomized lubricant with gas in the fluid occurred prior to such fluid entering the interior chamber of the cylinder sleeves. The atomized particles of lubricant partially or fully coat the inner surface of the interior chamber of the cylinder sleeves to thereby provide a lubrication coating on such surface. Such lubrication coating can be used to cool and/or lubricate one or more components of the piston and cylinder assembly (e.g., seals, piston guide, etc.). The lubrication coating can also optionally be used to facilitate in the formation of a gas seal between a portion of the piston and the inner surface of the interior chamber of the cylinder sleeves.

As the one or more cylinder assemblies move to a retracted piston position, the variable pressurized volume decreases within each of the cylinder sleeves, and a flow of fluid moves from the cylinder sleeves and into the fluid reservoir. The flow of fluid from the piston and cylinder assembly can include heat which may dissipated while the fluid in the fluid reservoir; however, this is not required. In one non-limiting arrangement, a portion of the press or cushion assembly is configured to push against the piston to move the piston to a retracted piston position after the piston has moved to the extended piston position; however, this is not required. Such arrangements are well known in the art and will not be further described herein. As can be appreciated, other arrangements can be used to move the one or more pistons of the gas cylinder assemblies to a retracted piston position.

The flow of fluid from the fluid reservoir to the one or more cylinder sleeves as the piston moves from the retracted piston position to the extended piston position is at least partially or fully caused by a pressure differential between the fluid reservoir and the expanding volume in the one or cylinder sleeves. This pressure differential causes at least a portion or all of the fluid in the fluid reservoir to flow through the fluid supply conduit and into the interior chamber of the one or more cylinder sleeves, thereby causing the atomized non-solid lubricant in the fluid to be deposited on or more portions of the inner wall of the interior chamber. As fluid flows into and/or out of the fluid reservoir, at least a portion of the non-solid lubricant that is not already atomized in the fluid reservoir, is atomized by the turbulence and/or pressure differential caused by the flow of fluid into and out of the fluid reservoir. In one non-limiting arrangement, most, if not all, (e.g., 51-100% and all values and ranges therebetween) of the non-solid lubricant is in the fluid that flows into the interior chamber of the cylinder sleeve is atomized and mix with a gas prior to into the cylinder sleeves of the one or more gas cylinder assemblies. In other words, most, it not all, the atomization of the non-solid lubricant is atomized at a location remote to the one or more cylinder sleeves prior to the atomized non-solid lubricant flowing into the one or more cylinder sleeves.

The fluid reservoir which contains the fluid is generally in the manifold housing and is connected in fluid communication with the cylinder assemblies via the fluid supply conduit. As such, the fluid reservoir is located remotely from the interior chamber of the cylinder sleeve of the one or more gas cylinder assemblies. As can be appreciated, the fluid reservoir can be located remotely from the manifold housing.

In one non-limiting aspect of the present disclosure, there is provided a manifold system that includes one or more cylinder assemblies and a lubrication arrangement that overcome several of the deficiencies and limitations of prior art manifold system that included cylinder assemblies. The manifold that includes the cylinder assembly and lubrication arrangement in accordance with the present disclosure can be made shorter or more compact than prior art manifold assemblies and, thus, better address space and size issues for manifolds being assembled at different manufacturing facilities. The manifold that includes the cylinder assembly and lubrication arrangement in accordance with the present disclosure does not require separate mechanical pumps to ensure the proper flow and amounts of lubricant into and out of the cylinder assemblies during operation of the cylinder assemblies, thereby simplifying the design of the manifold that includes the cylinder assembly and lubrication arrangement, and/or reducing the number of parts that could fail during use of the cylinder assembly and lubrication arrangement. The manifold that includes the cylinder assembly and lubrication arrangement in accordance with the present disclosure does not require separate gas passageways from the passageways that include the lubricant, which were used in the prior systems to control the pressure differential in the cylinder assembly and reservoir that included the lubricant. The elimination of such additional gas passageways simplifies the manifold configuration and reduces the incidence of the clogging of these gas passageways.

In another non-limiting aspect of the present disclosure, there is provided a manifold system that includes manifold housing, a fluid reservoir that includes gas and non-solid lubricant, a fluid supply conduit fluidly connected to the fluid reservoir, and one or more gas cylinder assemblies. The shape, size, configuration, and material of the manifold housing are non-limiting. The fluid reservoir can be located remotely from the manifold housing or be positioned partially or fully in the manifold housing. The fluid reservoir is generally located remotely from the interior chamber of the cylinder sleeve of the one or more gas cylinder assemblies. The shape, size, configuration, and material of the fluid reservoir are non-limiting. The fluid supply conduit can be formed of one or more fluid passageways. The fluid supply conduit can be partially or fully formed by passageways formed in the manifold housing, and/or can be partially or fully formed of pipes, tubing, and the like that are separate from the manifold housing. The fluid supply conduit is generally configured to allow the fluid to flow between the one or more cylinder sleeves and the fluid reservoir.

Each of the gas cylinder assemblies includes a cylinder sleeve and a piston. When two or more gas cylinder assemblies are included in the manifold housing, the cylinder sleeve of each of the gas cylinder assemblies is typically spaced from one another. Each of the cylinder sleeves can be partially or fully supported and maintained in position by the manifold housing. In one non-limiting arrangement, a manifold sleeve cavity is formed in the manifold housing which is configured to partially or fully receive the cylinder sleeve. When the cylinder sleeve is supported in the manifold housing, a portion or all of a bottom end of the cylinder sleeve can be spaced from the manifold housing to form a cylinder fluid gap to allow fluid to flow into and out of the internal cavity of the cylinder sleeve during the movement of the piston in the internal cavity of the cylinder sleeve. Generally, the cylinder fluid gap is in fluid communication with the fluid supply conduit. As can be appreciated, other or additional arrangements can be used to allow fluid flow into and/or out of the internal cavity of the cylinder sleeve during the movement of the piston in the internal cavity of the cylinder sleeve (e.g., one or more openings in side wall of the cylinder sleeve, one or more slots in a top and/or side wall of the cylinder sleeve, etc.).

In another non-limiting aspect of the present disclosure, there is provided a manifold system that includes a fluid reservoir that includes gas and non-solid lubricant; a fluid supply conduit fluidly connected to the fluid reservoir via a reservoir opening in the fluid reservoir; wherein the fluid flow into the fluid reservoir interacts with at least a portion or all of the non-solid lubricant in the fluid reservoir thereby causing at least portion of the non-solid lubricant in the fluid reservoir to atomize and mix with the gas in the fluid. When fluid exits the fluid reservoir, the exiting fluid that includes the atomized non-solid lubricant at least partially flows into the internal cavity of the cylinder sleeve of the one or more cylinder assemblies and at least partially or fully lubricates the inner surface of the interior chamber of the cylinder sleeve.

During initial start-up of the press or cushion assembly, little or no lubricant may be coating various portions of the inner surface of the interior chamber of the cylinder sleeve of each of the cylinder assemblies. Also, most, if not all, of the non-solid lubricant in the fluid reservoir is located in the bottom portion of the fluid reservoir and most, if not all, of the non-solid lubricant is separated from the gas in the reservoir other than the gas that has dissolved in the non-solid lubricant. Once the press or cushion assembly begins operation, the first few strokes of the piston within each of the cylinder sleeves may encounter little, if any, amount of lubricant on the inner surface of the interior chamber of the cylinder sleeve. However, after one or more strokes of the piston, the fluid is caused to flow into the fluid reservoir and cause atomization of at least a portion or all of the non-solid lubricant in the fluid reservoir. The atomized non-solid lubricant can optionally form an emulsion with the gas in the fluid. The operation of the press or cushion assembly can result in 2-100% (and all values and ranges therebetween) of the non-solid lubricant in the fluid reservoir to be eventually become atomized and forms a mixture (e.g., emulation, etc.) with the gas in the fluid. In one non-limiting arrangement, 10-100% of the non-solid lubricant in the fluid reservoir is eventually atomized and forms a mixture with the gas in the fluid. In another non-limiting arrangement, 20-100% of the non-solid lubricant in the fluid reservoir is eventually atomized and forms a mixture with the gas in the fluid. In another non-limiting arrangement, 30-100% of the non-solid lubricant in the fluid reservoir is eventually atomized and forms a mixture with the gas in the fluid. Once at least a portion of the non-solid lubricant is atomized and combines with the gas that is flowing into and out of the fluid reservoir, the atomized non-solid lubricant in the fluid is transported to the inner surface of the interior chamber of the cylinder sleeve to apply lubricant to at least a portion or all of the inner surface of the interior chamber of the cylinder sleeve as the piston moves within the interior chamber of the cylinder sleeve. Thereafter, further operation of the press or cushion assembly has the inner surface of the interior chamber of the cylinder sleeve at least partially lubricated as the piston moves within the interior chamber of the cylinder sleeve. In such novel lubrication arrangements, a separate pump is not required to supply lubricant to the interior chamber of the cylinder sleeve. The differential pressure in the interior chamber of the cylinder sleeve as the piston moves within the interior chamber of the cylinder sleeve causes the fluid to flow between the fluid reservoir and the interior chamber of the cylinder sleeve. Generally, the atomized non-solid lubricant remains as a mixture (e.g., emulation) with the gas during the operation of the one or more gas cylinder assemblies; however, this is not required. Generally, 20-100% (and all values and ranges therebetween) of the atomizes non-solid lubricant remains as a mixture with the gas as the fluid that includes the gas and atomized non-solid lubricant flows into and out of the fluid reservoir during the operation of the one or more gas cylinder assemblies. The number of strokes of the piston to cause atomization of the non-solid lubricant in the fluid reservoir and lubrication of the one or more-cylinder inner surface of the interior chamber of the cylinder sleeve with such atomize non-solid lubricant is non-limiting. In one non-limiting example, a cylinder assembly that operates at pressures between 300-4000 psi (and all values and ranges therebetween) and wherein the piston strokes at 10-500 strokes per minute (and all values and ranges therebetween), generally has atomized 0.1-100% (and all values and ranges therebetween) of the non-solid lubricant in the fluid reservoir so that the atomized non-solid lubricant that flows from the fluid reservoir at least partially or fully lubricates the inner surface of the interior chamber of the cylinder sleeve occurs within less than 10 minutes (e.g., 0.01-10 minutes and all values and ranges therebetween).

In another non-limiting aspect of the present disclosure, there is provided a manifold system wherein the fluid reservoir is located in the manifold housing, the fluid reservoir is spaced from one or more or all of the cylinder assemblies, and the fluid reservoir is positioned relative to the cylinder sleeve of one or more or all of the cylinder assemblies such that at least a portion or all (5-100% and all values and ranges therebetween) of the fluid reservoir is located between a top end and bottom end of the cylinder sleeve of one or more or all of the cylinder assemblies. In one non-limiting embodiment, at least at least 50% of the fluid reservoir is located between a top end and bottom end of the cylinder sleeve of one or more or all of the cylinder assemblies. In another non-limiting embodiment, 100% of the fluid reservoir is located between a top end and bottom end of the cylinder sleeve of all of the cylinder assemblies. The positioning of a portion or all of the fluid reservoir partially or fully between the top and bottom ends of the cylinder sleeve of all of the cylinder assemblies facilitates in the reduction of the size and/or volume of the manifold system.

In another non-limiting aspect of the present disclosure, there is provided a fluid reservoir that includes a reservoir opening for the fluid supply conduit so that fluid can flow through the reservoir opening and enter and exit the fluid reservoir via the fluid supply conduit, and wherein prior to and/or during at least a portion of the operation of the cylinder assemblies (e.g., prior to the piston moving within the cylinder sleeve, within a first few seconds or minutes of the piston moving within the cylinder sleeve, etc.), the fluid level of the non-solid lubricant in the fluid reservoir is below a top portion of the reservoir opening. In one non-limiting embodiment, the fluid level of the non-solid lubricant in the fluid reservoir prior to the operation of the one or more cylinder assemblies covers 1-99% (and all values and ranges therebetween) of the cross-sectional area of the reservoir opening into the fluid reservoir. In another non-limiting embodiment, the fluid level of the non-solid lubricant in the fluid reservoir prior to the operation of the one or more cylinder assemblies cover 60-90% of the cross-sectional area of the reservoir opening into the fluid reservoir. In another non-limiting embodiment, the fluid level of the non-solid lubricant in the fluid reservoir during at least 0.01-10 minutes (and all values and ranges therebetween) of the initial operation of the one or more cylinder assemblies covers 1-90% (and all values and ranges therebetween) of the cross-sectional area of the reservoir opening into the fluid reservoir. In one non-limiting embodiment, the fluid level of the non-solid lubricant in the fluid reservoir is below a top portion of the reservoir opening prior to the operation of the one or more cylinder assemblies. By having the non-solid lubricant level positioned below the top portion of the reservoir opening prior to the operation of the one or more cylinder assemblies, large volumes of the non-solid lubricant will not be caused to be drawn into the interior chamber of the cylinder sleeve via the fluid supply conduit when the piston initially moves to the extended piston position and/or impair the flow of gas into the fluid reservoir when the piston initially moves to the retracted piston position. Undesirable quantities of non-solid lubricant, when not in atomized form, can interfere with the proper operation of the cylinder assembly and/or can cause damage to the cylinder assembly. Blockage or significant impairment of gas flow into and/or out of the fluid reservoir can also interfere with the proper operation of the cylinder assembly and/or cause damage to the cylinder assembly and/or other components of a press or cushion assembly. Also, by having the non-solid lubricant level positioned below the top portion of the reservoir opening prior to and/or during the operation of the one or more cylinder assemblies, gas in the fluid that flows into the fluid reservoir can rapidly pass through the unobstructed portion of the reservoir opening while passing over a portion of the non-solid lubricant in the fluid reservoir that is located at or near the reservoir opening, thereby promoting the atomization of non-solid lubricant in the fluid reservoir. The rapid flow of gas over the top surface of the non-solid lubricant creates turbulence in the non-solid lubricant that promotes the atomization of at least a portion or all of the non-solid lubricant. The change in pressure in the fluid reservoir as fluid flows into and out of the fluid reservoir can also promote the atomization of a portion of the non-solid lubricant. When the non-solid lubricant level is positioned above the top portion of the reservoir opening prior to and/or during the operation of the one or more cylinder assemblies, the fluid is forced to bubble through the non-solid lubricant. Such bubbling through can result in extended times before a sufficient amount of non-solid lubricant is caused to be atomized in the fluid reservoir. Furthermore, when the fluid that includes atomized non-solid lubricant is flowing out of the fluid reservoir through the reservoir opening that is blocked by the non-solid lubricant, the fluid that passes through the non-solid lubricant when exiting the fluid reservoir can be partially or fully stripped of the atomized non-solid lubricant, thus impairing the supply of atomized non-solid lubricant to the cylinder sleeves.

In another non-limiting aspect of the present disclosure, at least a portion of the fluid passageways formed by the fluid supply conduit is positioned above a non-solid lubricant fluid level in the fluid reservoir. Such an arrangement limits the amount or prevents non-atomized non-solid lubricant from flowing from the fluid reservoir and into the interior chamber of the cylinder sleeve of the gas cylinder assembly. In one non-limiting arrangement, the non-solid lubricant fluid level in the fluid reservoir, prior to the operation of the gas cylinder assemblies, is located below the bottom end of one or more of the cylinder sleeves, and wherein the fluid supply conduit provides a pathway for at least a portion of the fluid that flows into and out of the cylinder sleeve at a location at or closely adjacent to the bottom end of the one or more cylinder sleeves. In a particular non-limiting arrangement, the non-solid lubricant fluid level in the fluid reservoir, prior to the operation of the gas cylinder assemblies, is located 30-100% (and all values and ranges) of the longitudinal length of the cylinder sleeve below the bottom end of one or more of the cylinder sleeves. In another particular non-limiting arrangement, the non-solid lubricant fluid level in the fluid reservoir, prior to the operation of the gas cylinder assemblies, is located 55-100% of the longitudinal length of the cylinder sleeve below the bottom end of one or more of the cylinder sleeves.

In another non-limiting aspect of the present disclosure, there is provided a manifold system wherein a cylinder sleeve gap between a cavity in the manifold housing and at least portion of the cylinder sleeve of one or more cylinder assemblies is less than 0.05 inches. In one non-limiting embodiment, the cylinder sleeve gap between the cavity in the manifold housing and at least portion of the cylinder sleeve of one or more cylinder assemblies is 0.0001-0.05 inches (and all values and ranges therebetween). In another non-limiting embodiment, the cylinder sleeve gap between the cavity in the manifold housing and at least portion of the cylinder sleeve of one or more cylinder assemblies is 0.01-0.03 inches. Generally, the cylinder sleeve gap is at least partially or fully located at the bottom portion of the cylinder sleeve; however, this is not required. The cylinder sleeve gap can optionally be in fluid communication with the cylinder fluid gap and/or the fluid supply conduit. When the cylinder sleeve gap is in fluid communication with the cylinder fluid gap and/or the fluid supply conduit, the cylinder sleeve gap is generally sized and shaped such that less than 5% (0-5% and all values and ranges therebetween) of the fluid that is flowing between the cylinder sleeve and the fluid supply conduit flows through the cylinder sleeve gap. The size and shape of the cylinder sleeve gap can be selected so that no additional sealing arrangement (e.g., sealing ring, etc.) is required to prevent an undesired amount of fluid to flow through the cylinder sleeve gap during the operation of the gas cylinder assembly. Such absence of additional sealing arrangements simplifies the manifold assembly for the gas cylinder assembly and can optionally improve the operational longevity of the gas cylinder assembly. In an overpressure-situation during the operation of the gas cylinder assembly, the cylinder sleeve gap can optionally function as a pressure release so as to minimize or prevent damage to one or more components of the manifold and/or gas cylinder assembly.

In one non-limiting object of the present disclosure, there is provided a new and improved press or cushion assembly that includes an improved lubrication arrangement for one or more gas cylinder assemblies used in the press or cushion assembly.

In another and/or alternative non-limiting object of the present disclosure, there is provided a new and improved press or cushion assembly that includes an improved lubrication arrangement for one or more gas cylinder assemblies used in the press or cushion assembly and which can optionally be smaller and/or shorter than prior art press or cushion assemblies having the same sized gas cylinder assemblies.

In another and/or alternative non-limiting object of the present disclosure, there is provided a manifold system that can optionally be used in a press or cushion assembly, wherein the manifold system includes a manifold housing, a gas cylinder assembly, and a fluid reservoir that includes gas and non-solid lubricant; and wherein the gas cylinder assembly is fluidly connected to the fluid reservoir by a fluid supply conduit fluidly; and wherein atomized non-solid lubricant flows into a cylinder sleeve of the gas cylinder assembly is used to at least partially or fully lubricate an inner surface of an interior chamber of the cylinder sleeve during the operation of the gas cylinder assembly.

In another and/or alternative non-limiting object of the present disclosure, there is provided a manifold system that includes a) a manifold housing; b) a fluid reservoir that includes gas and non-solid lubricant; c) a fluid supply conduit fluidly connected to the fluid reservoir; and d) a first gas cylinder assembly that includes a cylinder sleeve supported in the manifold housing and a piston that is movable between retracted and extended piston positions within the interior chamber of the cylinder sleeve; and wherein a bottom end of the cylinder sleeve is spaced from the manifold housing to form a cylinder fluid gap; and wherein the piston optionally includes a seal arrangement configured to inhibit fluid from flowing out a bottom end of the cylinder sleeve as the piston axially moves between the retracted and extended piston positions within the interior chamber; and wherein the cylinder fluid gap is fluidly connected to the fluid supply conduit; and wherein the fluid reservoir is optionally located remotely from the interior chamber of the cylinder sleeve of the first gas cylinder assembly; and wherein at least a portion or all of the non-solid lubricant in the fluid reservoir is caused to be atomized in the fluid reservoir when gas flows into and/or out of the fluid reservoir and interacts with the non-solid lubricant in the fluid reservoir; and wherein at least a portion of the fluid flows from the cylinder sleeve and into the fluid reservoir via the fluid supply conduit as the piston moves toward a bottom end of the cylinder sleeve; and wherein at least a portion of the atomized non-solid lubricant flows into the interior chamber of the cylinder sleeve via the fluid supply conduit as the piston moves toward a top end of the cylinder sleeve; and wherein the atomized non-solid lubricant that flows into the cylinder sleeve at least partially or fully lubricates an inner surface of the interior chamber of the cylinder sleeve.

In another and/or alternative non-limiting object of the present disclosure, there is provided a manifold system wherein the piston optionally includes a seal arrangement that is configured to inhibit fluid from flowing out a bottom end of the cylinder sleeve as the piston axially moves between the retracted and extended piston positions within the interior chamber.

In another and/or alternative non-limiting object of the present disclosure, there is provided a manifold system wherein the fluid reservoir is located in the manifold housing; and wherein the fluid reservoir is positioned relative to the cylinder sleeve such that at least a portion or all of the fluid reservoir is optionally located between the top and bottom ends of the cylinder sleeve.

In another and/or alternative non-limiting object of the present disclosure, there is provided a manifold system wherein a fluid level of the non-solid lubricant in the fluid reservoir prior to operation of the first gas cylinder assembly is optionally below a top portion of said reservoir opening.

In another and/or alternative non-limiting object of the present disclosure, there is provided a manifold system wherein there is optionally a cylinder sleeve gap between the manifold housing and a bottom portion of the cylinder sleeve, and wherein the cylinder sleeve gap is optionally less than 0.05 inches (e.g., 0.0001-0.05 inches, 0.015-0.025 inches, etc.) when the bottom portion of the cylinder sleeve is at least partially or fully located in a manifold cavity; and wherein a size of the cylinder sleeve gap optionally results in less than 5% of the fluid that is flowing between the cylinder sleeve and the fluid supply conduit from flowing through the cylinder sleeve gap; and wherein the cylinder sleeve gap is optionally absent a fluid seal.

In another and/or alternative non-limiting object of the present disclosure, there is provided a manifold system wherein a flow of the non-solid lubricant into and out of the cylinder sleeve is at least partially or fully caused by the axial movement of the piston in the cylinder sleeve and optionally without use of a fluid pump.

In another and/or alternative non-limiting object of the present disclosure, there is provided a manifold system that further includes a second gas cylinder assembly that is optionally similar in structure to the first gas cylinder assembly; and wherein the second gas cylinder assembly is positioned adjacent to and spaced from the first gas cylinder assembly; and wherein the fluid reservoir is located remotely from the interior chamber of the cylinder sleeve of the second gas cylinder assembly; and wherein at least a portion of the atomized non-solid lubricant in the fluid supply conduit flows into the interior chamber of the cylinder sleeve of the second gas cylinder assembly via the fluid supply conduit as the piston moves toward a top end of the cylinder sleeve of the second gas cylinder; and wherein the atomized non-solid lubricant that flows into the cylinder sleeve of second gas cylinder assembly at least partially or fully lubricates an inner surface of the interior chamber of the cylinder sleeve of second gas cylinder assembly.

In another and/or alternative non-limiting object of the present disclosure, there is provided a method for lubrication of a cylinder assembly in a manifold system comprising the non-limiting steps of a) providing a manifold housing; b) providing a fluid reservoir that includes gas and non-solid lubricant; c) providing a fluid supply conduit that is fluidly connected to the fluid reservoir; d) providing a first gas cylinder assembly that includes a cylinder sleeve that is at least partially or fully supported in the manifold housing and a piston that moves axially between retracted and extended piston positions within an interior chamber of the cylinder sleeve, a bottom end of the cylinder sleeve is spaced from the manifold housing to form a cylinder fluid gap, and the cylinder fluid gap is fluidly connected to the fluid supply conduit; e) moving the piston in the cylinder sleeve toward the bottom end of the cylinder sleeve and thereby causing at least a portion of the gas in the cylinder sleeve to flow from the cylinder sleeve through the fluid supply conduit and into the fluid reservoir; f) causing atomization of at least a portion or all of the non-solid lubricant by the gas flowing into and/or out of the fluid reservoir; and g) moving the piston in the cylinder sleeve toward the top end of the cylinder sleeve and thereby causing at least a portion or all of the atomized non-solid lubricant in the fluid reservoir to flow from the fluid reservoir, through the fluid supply conduit and into the cylinder sleeve; and wherein the fluid reservoir is located remotely from the interior chamber of the cylinder sleeve of the first gas cylinder assembly; and wherein the atomized non-solid lubricant that flows into the cylinder sleeve at least partially or fully lubricates an inner surface of the interior chamber of the cylinder sleeve.

In another and/or alternative non-limiting object of the present disclosure, there is provided a molding or stamping system comprising a) a molding or stamping arrangement that is configured to cause a material to be molded, shaped, and/or stamped; b) a manifold system that includes a cylinder assembly, the cylinder assembly configured to move one or more components of the molding or stamping arrangement to cause the material to be molded, shaped, and/or stamped; said manifold system includes i) a manifold housing, ii) a fluid reservoir that includes gas and non-solid lubricant, iii) a fluid supply conduit that is fluidly connected to the fluid reservoir, iv) providing a first gas cylinder assembly that includes a cylinder sleeve that is at least partially or fully supported in the manifold housing and a piston that moves axially between retracted and extended piston positions within an interior chamber of the cylinder sleeve; a bottom end of the cylinder sleeve is spaced from the manifold housing to form a cylinder fluid gap; and the cylinder fluid gap is fluidly connected to the fluid supply conduit; and wherein the fluid reservoir is located remotely from the interior chamber of the cylinder sleeve of the first gas cylinder assembly; and wherein at least a portion or all of the non-solid lubricant is caused to be atomized in the fluid reservoir when gas flows into and/or out of the fluid reservoir and interacts with the non-solid lubricant in the fluid reservoir; and wherein at least a portion of the atomized non-solid lubricant in the fluid reservoir flows into the interior chamber of the cylinder sleeve via the fluid supply conduit as the piston moves toward a top end of the cylinder sleeve; and wherein the atomized non-solid lubricant that flows into the cylinder sleeve at least partially or fully lubricates an inner surface of the interior chamber of the cylinder sleeve.

These and other advantages will become apparent to those skilled in the art upon the reading and following of this description.

BRIEF DESCRIPTION OF THE DRAWINGS

Reference may now be made to the drawings, which illustrate various embodiments that the disclosure may take in physical form and in certain parts and arrangement of parts wherein:

FIG. 7 is a similar view of FIG. 3 that illustrates the direction of fluid flow as the piston moves to the retracted piston position;

FIG. 8 is a similar view to FIG. 6 that illustrates fluid flow into the fluid reservoir and at least partial atomization of the non-solid lubricant in the fluid reservoir;

DETAILED DESCRIPTION OF VARIOUS NON-LIMITING EMBODIMENTS OF DISCLOSURE

Figure 1:
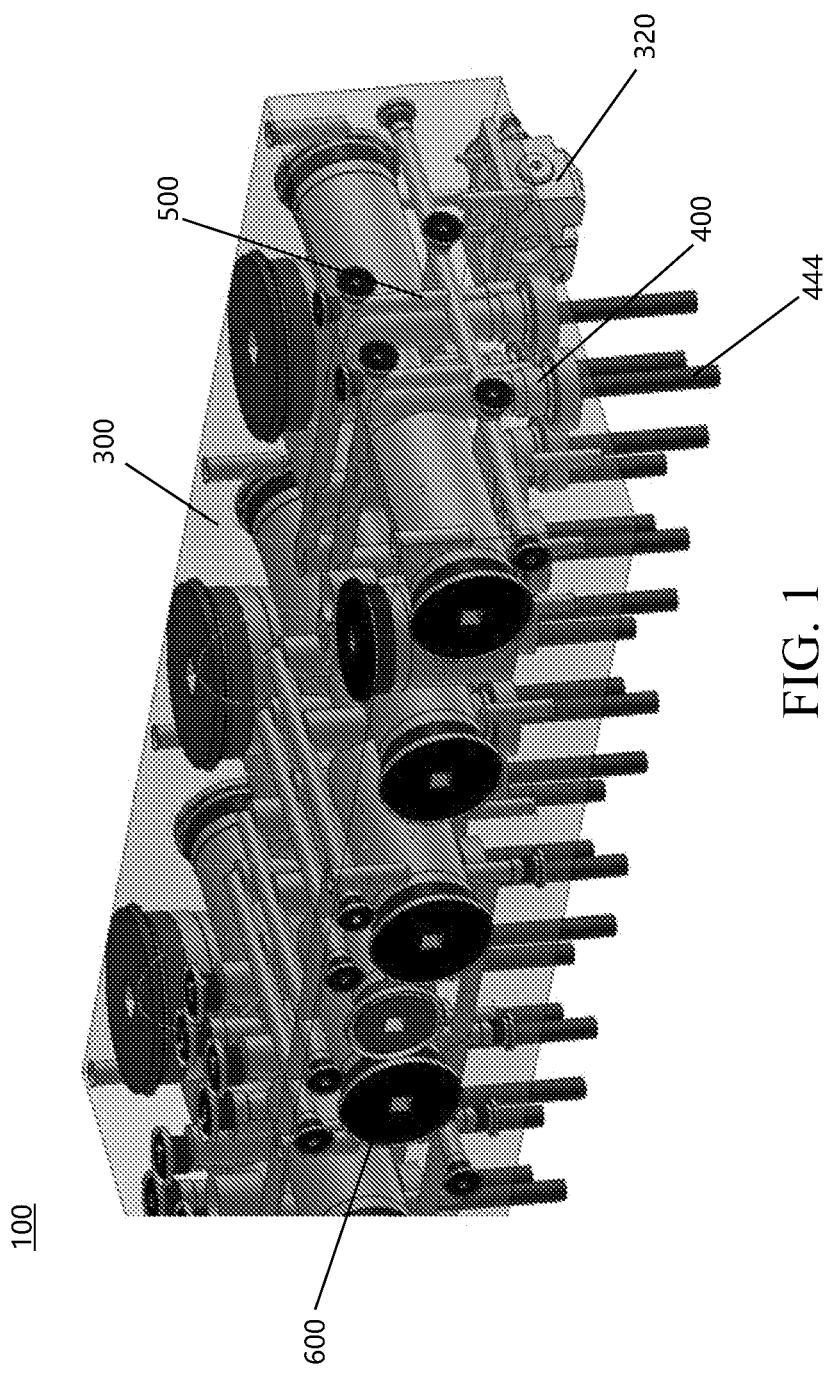
FIG. 1 is a sectional view of an upper manifold system that includes a plurality of fluid reservoirs and a plurality of gas cylinder assemblies.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

In contrast to nitrogen manifold systems mounted on the lower section of the pressing or cushion assemblies, when a nitrogen manifold system is mounted on the moving ram of a press, such a setup inverts the cylinder rods and subsequently the oil does not collect at the bottom portion of the cylinder sleeve. Such a manifold setup is considered an upper mounting manifold setup. In such an arrangement, the piston with high pressure seals axially slides on the inner surface of the cylinder sleeve that has little, if any, oil. Such dry cycling of the high pressure seals can cause early failure or leakage of nitrogen.

One prior art lubrication system for an upper mounting manifold setup is disclosed in U.S. Pat. No. 4,688,775, which is fully incorporated herein by reference. The lubrication arrangement for the cylinder assembly in the manifold causes oil to flow into the bottom portion of the cylinder sleeve of the cylinder assembly to lubricate the seals on the piston to extend the life of the cylinder assembly.

Although the lubrication arrangement disclosed in U.S. Pat. No. 4,688,775 is effective in lubricating the cylinder assembly during use, the oil reservoir used for the lubricating arrangement is positioned on the manifold at a location that is above or below the bottom end of the cylinder in the cylinder assembly to feed the oil into the bottom portion of the cylinders. Such an arrangement results in the height of the manifold arrangement being increased to accommodate the oil reservoir. Also, this lubrication arrangement requires additional gas passageways to control the pressure differential in the cylinder assembly and lubrication arrangement. In some arrangements, a separate pump system that is spaced from the cylinders is required to pump the oil back to the oil reservoir.

In view of the current state of the art of gas cylinder systems, the present inventor has conceived of an improved compact gas cylinder system that can effectively lubricate the components of the gas cylinder system during operation of the gas cylinder system.

Referring now to FIGS. 1-11, there is illustrated a manifold system 100 that can be used in conjunction with a press or cushion arrangement 200 to stamp, punch, mold, etc., materials to parts in the automotive industry, manufacturing industry, medical field, etc. The components of a press or cushion arrangement 200 (e.g., transfer plate, press bolster, lower die, upper die, upper die shoe, lower die shoe, pressure pad, die member, transfer pins, binder, press slide, etc.) are well known in the art, thus the components of press or cushion arrangement 200 and how such components are used to form materials into parts will not be further described herein.

Figure 2:
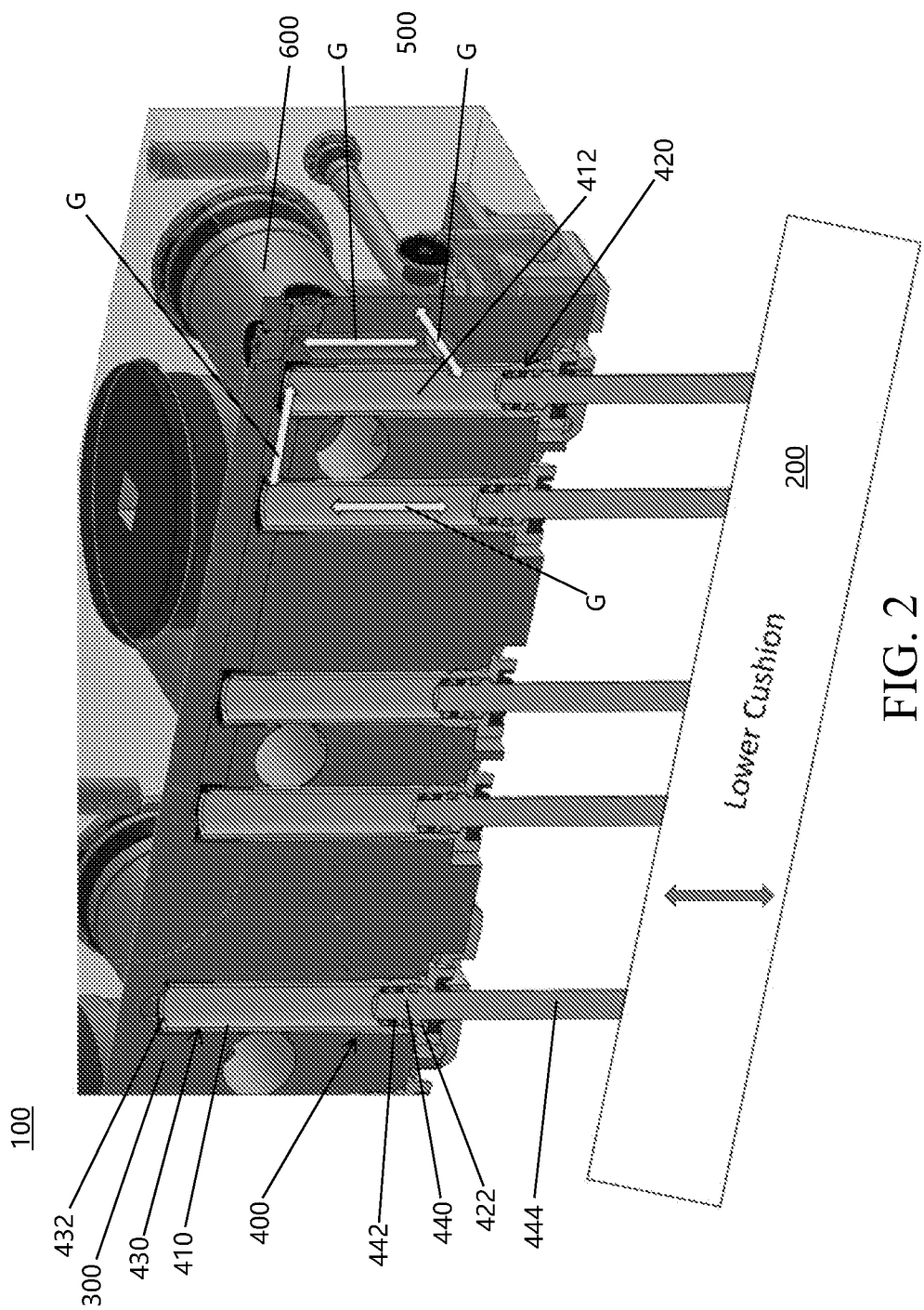
FIG. 2 is a partial view of the upper manifold system of FIG. 1 where the piston rods engage a lower cushion arrangement.

Referring to FIGS. 1 and 2, manifold system 100 is oriented in the upper mounting manifold setup wherein the piston rods 444 of the piston 440 of the gas cylinder assemblies 400 are facing downwardly from the cylinder sleeve 410 of the gas cylinder assemblies. Gas cylinder assemblies 400 are fluidly connected to the fluid reservoir 600 by a fluid supply conduit 500. As illustrated in FIGS. 1 and 2, a plurality of gas cylinder assemblies 400 can be fluidly connected to fluid reservoir 600 by a fluid supply conduit 500; however, this is not required. Fluid supply conduit 500 can be formed of one or more passageways in manifold housing 300. The one or more passageways in manifold housing 300 can be at least partially or fully formed by drilled passageways in manifold housing 300, pipes, tubes, etc. Fluid reservoir 600 illustrated as oriented such that the longitudinal axis of fluid reservoir 600 is generally perpendicular to the longitudinal axis of cylinder sleeve 410 of gas cylinder assemblies 400; however, this is not required. Manifold system 100 can include one or more gauges 320 and/or other types of monitoring instruments to monitor pressure, temperature, lubricant levels, piston stroke speed, number of piston strokes per minute, etc., during the operation of the manifold system.

Referring now to FIG. 2, the fluid flow of fluid into and out of interior chamber 412 of cylinder sleeve 410 as piston 440 moves axially within interior chamber 412 in cylinder sleeve 410 between the extended and retracted piston positions is illustrated by the flow arrows. Piston 440 is illustrated as in the extended piston position in FIG. 2. In such position, piston 440 is located at or close to the top end 422 of the top portion 420 of cylinder sleeve 410. When piston 440 is in the retracted piston position, piston 440 is located at or close to bottom end 432 of bottom portion 430 of cylinder sleeve 410. During movement of piston 440 within interior chamber 412 of cylinder sleeve 410, fluid is inhibited or prevented from escaping out top end 422 of cylinder sleeve 410 by one or more seals 442 that are located on piston 440 and/or other regions of gas cylinder assembly 400.

Figures 3, 4:
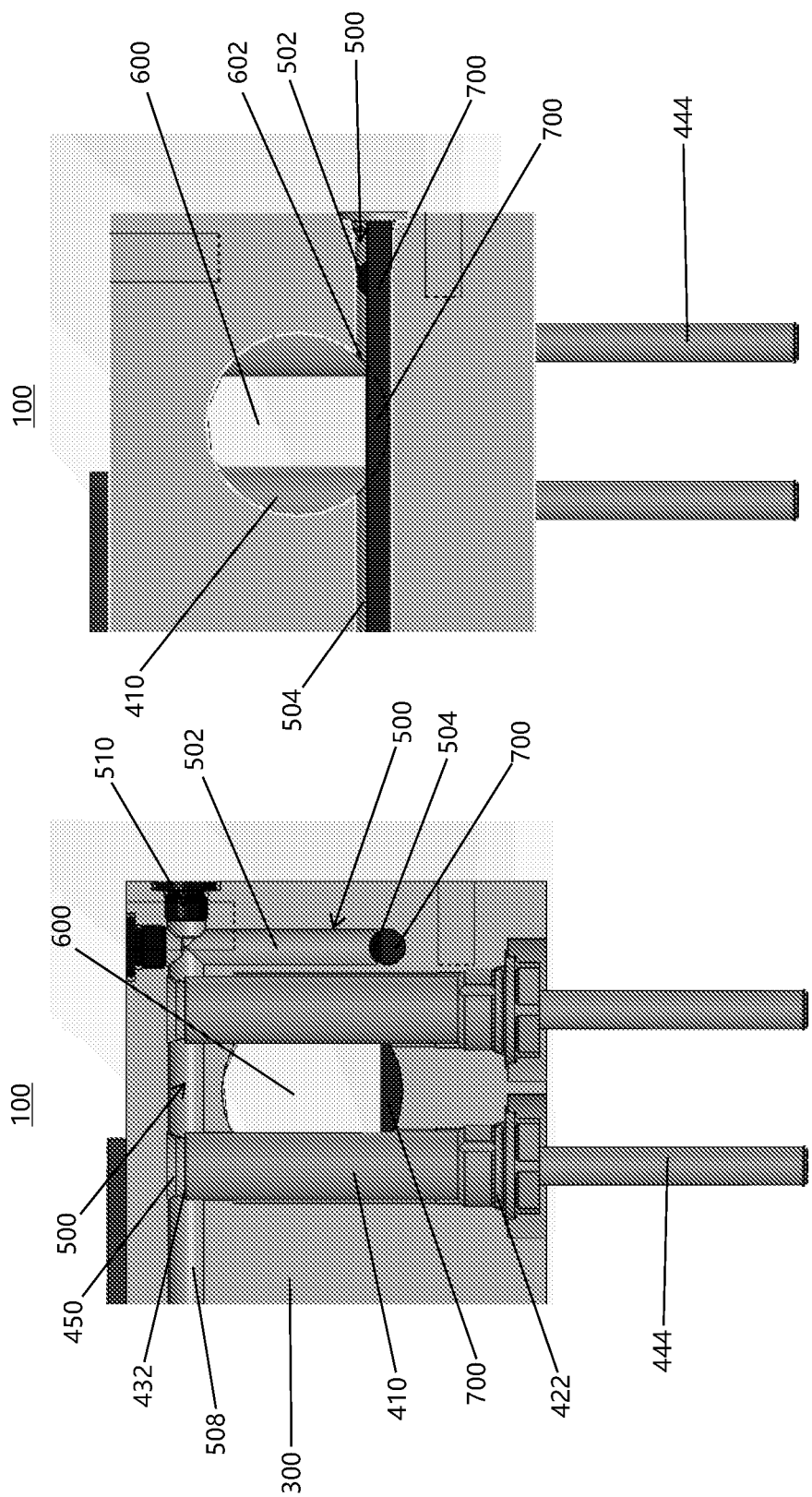
FIG. 3 is a cross-section of a portion of the upper manifold system of FIG. 1 illustrating two gas cylinder assemblies, a portion of a fluid supply conduit and a fluid reservoir.
FIG. 4 is a cross-section of a portion of the upper manifold system of FIG. 1 illustrating a rear view of FIG. 3 and showing the fluid level of the non-solid lubricant in the fluid reservoir relative to the reservoir opening.
Figures 5, 6:
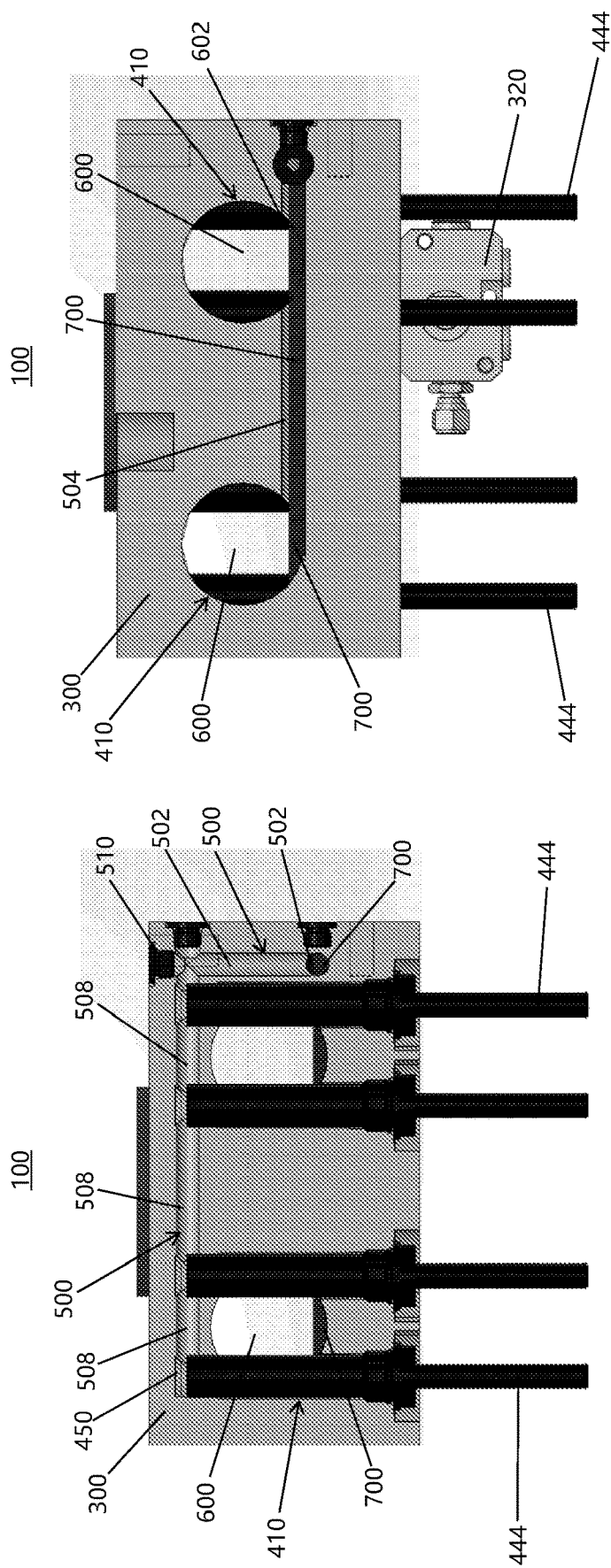
FIG. 5 is a similar cross-sectional view as illustrated in FIG. 3 and illustrates two sets of gas cylinder assemblies, a portion of two fluid supply conduits, and a fluid reservoir.
FIG. 6 is a cross-section of a portion of the upper manifold system of FIG. 1 illustrating a rear view of FIG. 5.

Referring now to FIGS. 3-6, the location of fluid reservoir 600 relative to the position of cylinder sleeves 410 of gas cylinder assemblies 400 is shown. Fluid reservoir 600 is configured to include gas (e.g., nitrogen gas) and non-solid lubricant 700. The gas in fluid reservoir 600 is typically pressurized gas. The fluid reservoir is illustrated as located between top end 422 and bottom end 432 of cylinder sleeve 410. As can be appreciated, fluid reservoir 600 can be located partially or fully between top end 422 and bottom end 432 of cylinder sleeve 410. The bottom portion of the fluid reservoir includes non-solid lubricant 700 (e.g., T2 oil, etc.). As illustrated in FIGS. 4 and 6, the fluid level of non-solid lubricant 700 in fluid reservoir 600 is such that the top surface of non-solid lubricant 700 is located below the top of reservoir opening 602. Reservoir opening 602 is located at or near the bottom of fluid reservoir 600 and is fluidly connected to fluid supply conduit 500.

As illustrated in FIGS. 4 and 6, lower horizontal passageway 504 of fluid supply conduit 500 is fluidly connected to fluid reservoir 600 via reservoir opening 602. As illustrated in FIGS. 4 and 6, non-solid lubricant 700 can optionally fill a portion of lower horizontal passageway 504 of fluid supply conduit 500. When non-solid lubricant is located in lower horizontal passageway 504 of fluid supply conduit 500 and/or any other portion of fluid supply conduit 500, the fluid level of non-solid lubricant 700 is such that it does not fully fill any portion of fluid supply conduit 500; however, this is not required.

As illustrated in FIGS. 3-10, fluid supply conduit 500 includes a lower horizontal passageway 504 that is fluidly connected to fluid reservoir 600, a vertical passageway 502 that is fluidly connected to lower horizontal passageway 504, and an upper horizontal passageway 508 that is fluidly connected to vertical passageway 502, and wherein upper horizontal passageway 508 is fluidly connected to cylinder fluid gap 450 located between bottom end 432 of cylinder sleeve 410 and manifold housing 300. As can be appreciated, fluid supply conduit 500 can have other or additional configurations to enable fluid flow between fluid reservoir 600 and the cylinder sleeve of one or more of gas cylinder assemblies 400. Lower horizontal passageway 504 is illustrated such that all or at least a portion (e.g., 10-100% and all values and ranges therebetween) of lower horizontal passageway 504 is located below cylinder fluid gap 450 and/or bottom end 432 of cylinder sleeve 410. Upper horizontal passageway 508 is illustrated such that a) all or at least a portion (e.g., 10-100% and all values and ranges therebetween) of upper horizontal passageway 508 is located above lower horizontal passageway 504, b) all or at least a portion (e.g., 10-100% and all values and ranges therebetween) of upper horizontal passageway 508 is located above a non-solid fluid level in fluid reservoir 600 prior to the operation of one or more gas cylinder assemblies 400, c) all or at least a portion (e.g., 10-100% and all values and ranges therebetween) of upper horizontal passageway 508 is located above fluid reservoir 600, and/or d) all or at least a portion (e.g., 10-100% and all values and ranges therebetween) of upper horizontal passageway 508 is located at or above bottom end 432 of cylinder sleeve 410 and/or cylinder fluid gap 450. Vertical passageway 502 is illustrated such that a) all or at least a portion (e.g., 10-100% and all values and ranges therebetween) of vertical passageway 502 is located above lower horizontal passageway 504, and/or b) all or at least a portion (e.g., 10-100% and all values and ranges therebetween) of vertical passageway 502 is located below upper horizontal passageway 508. Upper horizontal passageway 508 can be fluidly connected to only one cylinder fluid gap 450 or can be connected to multiple cylinder fluid gaps 450 of different cylinder sleeves 410. The cross-sectional area of the fluid passageway through fluid supply conduit 500 is selected so as to not impair the flow of fluid between cylinder sleeve 410 of each of the gas cylinder assemblies 400 and fluid reservoir 400.

Figure 11:
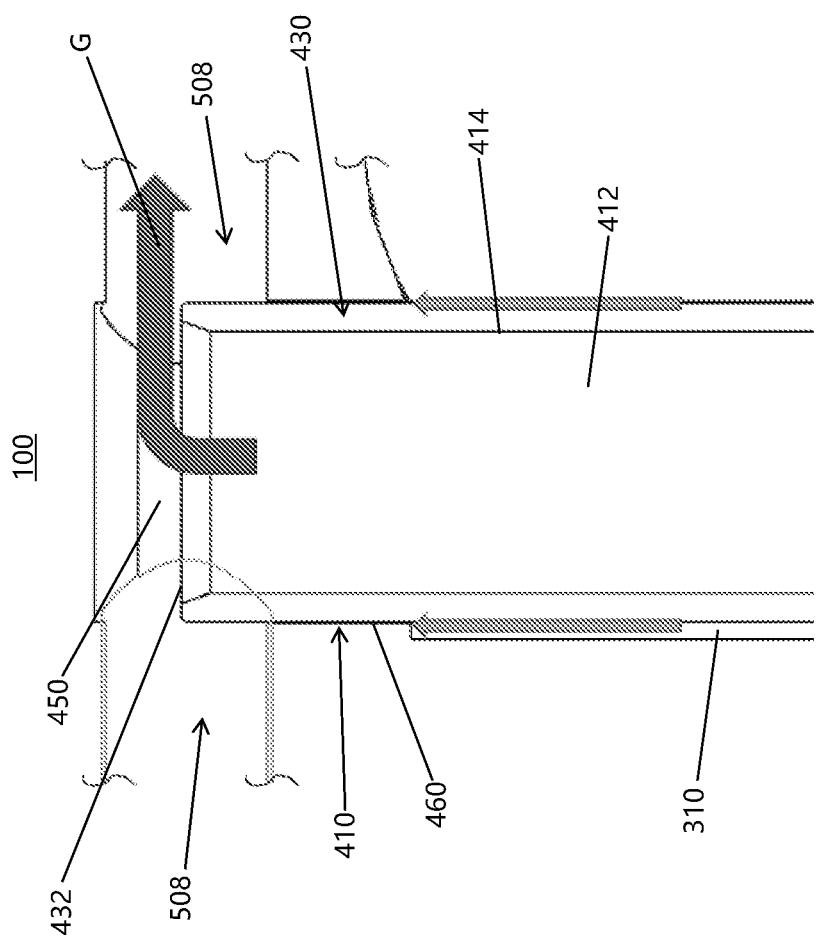
FIG. 11 is an enlarged cross-sectional view of a lower portion of a cylinder sleeve of a gas cylinder assembly positioned in a cavity of the manifold housing that shows a small gap between the lower portion of the cylinder sleeve and the manifold housing.

Referring now to FIG. 11, bottom portion 430 of cylinder sleeve 410 is positioned in a manifold cavity 310 in manifold housing 300. The top region of manifold cavity 310 can be shaped and formed such that a spacing between the outer surface of the cylinder sleeve and manifold cavity 310 is optionally less than 0.05 inches (e.g., 0.0001-0.05 inches, 0.01-0.03 includes, etc.). Such a small spacing functions as an effective fluid seal between manifold housing 300 and cylinder sleeve 410, thus additional seal arrangements (e.g., polymeric sealing rings, etc.) are not required to further seal cylinder sleeve 410 with manifold housing 300 during the operation of the gas cylinder assembly in manifold housing 300.

Referring now to FIGS. 2 and 7-11, a non-limiting operation of the gas cylinder assembly in manifold housing 300 is illustrated. As illustrated in FIG. 2, cushion arrangement 200 is configured to move up and down as indicated by the arrow. Cushion arrangement 200 is typically moved downwardly by piston rods 444 as piston 440 in cylinder sleeve 410 of each of gas cylinder assemblies 400 moves from the retracted piston position to the extended piston position. In one non-limiting arrangement, cushion arrangement 200 includes a lift mechanism to lift at least a portion of cushion arrangement 200 and thereby apply a force to piston rods 444 to cause piston 440 in cylinder sleeve 410 of each of gas cylinder assemblies 400 to move from the extended piston position to the retracted piston position. Each set of movements of piston 440 from the extended piston position to the retracted piston position and back to the extended piston position is considered a single cycle or stroke of piston 440 in cylinder sleeve 410 of gas cylinder assembly 400.

As piston 440 axially moves between the extended piston position and the retracted piston position in cylinder sleeve 410 of gas cylinder assembly 400, fluid flows between interior chamber 412 of cylinder sleeve 410 and fluid reservoir 600 via fluid supply conduit 500. The fluid flow arrows in FIGS. 7-10 illustrate the fluid flow direction as piston 440 axially moves between the extended piston position and the retracted piston position in cylinder sleeve 410 of gas cylinder assembly 400.

Referring now to FIGS. 7 and 8, when piston 440 axially moves toward the retracted piston position in cylinder sleeve 410 of gas cylinder assembly 400 when a force is applied to the piston rods in the direction of force arrows F, the volume of interior chamber 412 between the top of piston 440 and top end 422 of the cylinder sleeve decreases. As discussed above, such movement of piston 440 can be caused by cushion arrangement 200 and/or by some other arrangement. As the volume of interior chamber 412 between the top of piston 440 and top end 422 of the cylinder sleeve decreases, the pressure increases in interior chamber 412 and causes fluid in interior chamber 412 to flow out of interior chamber 412, past cylinder fluid gap 450, into at least a portion of fluid supply conduit 500 and the fluid reservoir 600 as indicated by fluid flow arrows G in FIGS. 7 and 8. As illustrated in FIG. 8, as fluid (e.g., nitrogen gas, etc.) flows through lower horizontal passageway 504, through reservoir opening 602 and into fluid reservoir 600, the fluid passes over and/or through at least a portion of any non-solid lubricant 700 in lower horizontal passageway 504, and over and/or through at least a portion of any non-solid lubricant in fluid reservoir 600. Such fluid creates turbulence that causes at least a portion of the non-solid lubricant to become atomized lubricant 702 that combines and mixes with the fluid in fluid reservoir 600. FIGS. 3 and 4 illustrated the fluid level of non-solid lubricant 700 in fluid reservoir 600 prior to the operation of gas cylinder assemblies 400 in manifold system 100. After operation of gas cylinder assemblies 400, a portion of all of non-solid lubricant 700 in fluid reservoir 600 will become atomized lubricant 702.

Figure 10:
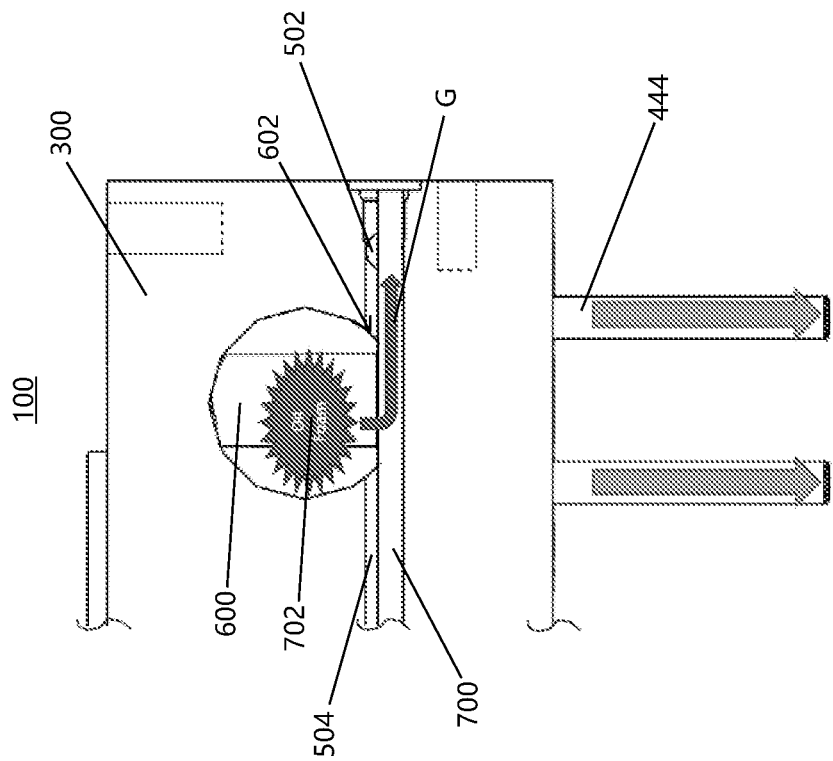
FIG. 10 is a similar view to FIG. 8 that illustrates fluid flow out the fluid reservoir and at least a portion of the atomized non-solid lubricant in the fluid reservoir flows out of the fluid reservoir and into the fluid supply conduit.
Figure 9:
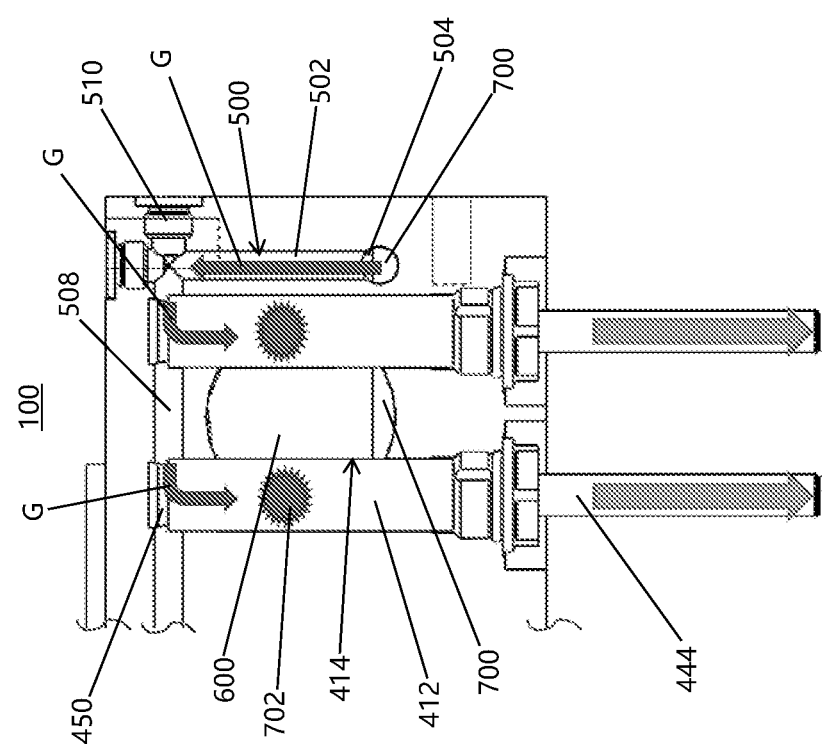
FIG. 9 is a similar view of FIG. 3 that illustrates the direction of fluid flow as the piston moves to the extended piston position and the atomized non-solid lubricant enters the interior chamber of the cylinder sleeves and at least partially lubricates the inner wall of the interior chamber.

Referring now to FIGS. 9 and 10, when piston 440 axially moves toward the extended piston position in cylinder sleeve 410 of gas cylinder assembly 400, the volume of interior chamber 412 between the top of piston 440 and top end 422 of cylinder sleeve 410 increases. Generally, the pressurized fluid in fluid reservoir 600 causes such axial movement of piston 440 in cylinder sleeve 410. As the volume of interior chamber 412 between the top of piston 440 and top end 422 of the cylinder sleeve increases, the pressure decreases in interior chamber 412 and causes fluid from fluid reservoir 600 to flow into the fluid supply conduit 500, past cylinder fluid gap 450, and into interior chamber 412 as indicated by fluid flow arrows G in FIGS. 9 and 10. As illustrated in FIG. 9, as the fluid flows into interior chamber 412, atomized lubricant 702 in the fluid from fluid reservoir 600 enters interior chamber 412 and coats inner wall 414 of interior chamber 412 with lubricant.

The fluid pathways illustrated in FIGS. 7-10 are repeated as the piston 440 moves axially within the cylinder sleeve 410 of each of the gas cylinder assemblies during the operation of the manifold system 100, thereby constantly and continuously lubricating the inner wall 414 of the interior chamber 412.

Referring now to FIG. 11, as the fluid enters and exits cylinder sleeve 410, the fluid flow over upper sleeve gap 460. The size of upper sleeve gap 460 can be such that little, if any, fluid that enters and exits cylinder sleeve 410 flow through upper sleeve gap 460. If any fluid does enter upper sleeve gap 460, some or all of such fluid can be drawn out of upper sleeve gap 460 when the fluid exits cylinder sleeve 410 and flows into fluid supply conduit 500 as indicated by the flow arrows.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed:

1. A manifold system that includes a cylinder assembly comprising:
   a manifold housing;

a fluid reservoir that includes gas and non-solid lubricant;

a fluid supply conduit fluidly connected to said fluid reservoir via a reservoir opening in said fluid reservoir;

a first gas cylinder assembly including a cylinder sleeve supported in a first manifold cavity of said manifold housing and a piston; said cylinder sleeve forming an interior chamber wherein said piston axially moves between retracted and extended piston positions within said interior chamber; a bottom end of said cylinder sleeve spaced from said manifold housing to form a cylinder fluid gap; said cylinder fluid gap fluidly connected to said fluid supply conduit; and wherein said fluid reservoir is located remotely from said interior chamber of said cylinder sleeve of said first gas cylinder assembly; and wherein at least a portion of said non-solid lubricant in said fluid reservoir is atomized in said fluid reservoir when said gas flows into said fluid reservoir and interacts with said non-solid lubricant in said fluid reservoir; and wherein at least a portion of said atomized non-solid lubricant flows into said interior chamber of said cylinder sleeve via said fluid supply conduit as said piston moves toward a top end of said cylinder sleeve; and wherein said atomized non-solid lubricant flows into said cylinder sleeve to at least partially lubricates an inner surface of said interior chamber of said cylinder sleeve.

2. The manifold system as defined in claim 1, wherein said piston includes a seal arrangement configured to inhibit fluid from flowing out a bottom end of said cylinder sleeve as said piston axially moves between said retracted and extended piston positions within said interior chamber.

3. The manifold system as defined in claim 1, wherein said fluid reservoir is located in said manifold housing; said fluid reservoir is positioned relative to said cylinder sleeve such that at least a portion of said fluid reservoir is located between said top and bottom ends of said cylinder sleeve.

4. The manifold system as defined in claim 2, wherein said fluid reservoir is located in said manifold housing; said fluid reservoir is positioned relative to said cylinder sleeve such that at least a portion of said fluid reservoir is located between said top and bottom ends of said cylinder sleeve.

5. The manifold system as defined in claim 2, wherein at least 50% of said fluid reservoir is located between said top and bottom ends of said cylinder sleeve.

6. The manifold system as defined in claim 3, wherein at least 50% of said fluid reservoir is located between said top and bottom ends of said cylinder sleeve.

7. The manifold system as defined in claim 2, wherein 100% of said fluid reservoir is located between said top and bottom ends of said cylinder sleeve.

8. The manifold system as defined in claim 3, wherein 100% of said fluid reservoir is located between said top and bottom ends of said cylinder sleeve.

9. The manifold system as defined in claim 1, wherein a fluid level of said non-solid lubricant in said fluid reservoir prior to operation of said first gas cylinder assembly is below a top portion of said reservoir opening.

10. The manifold system as defined in claim 8, wherein a fluid level of said non-solid lubricant in said fluid reservoir prior to operation of said first gas cylinder assembly is below a top portion of said reservoir opening.

11. The manifold system as defined in claim 1, wherein a cylinder sleeve gap between said manifold housing and a bottom portion of said cylinder sleeve is less than 0.05 inches when said bottom portion of said cylinder sleeve is located in said first manifold cavity; a size of said cylinder sleeve gap results in less than 5% of said fluid flowing between said cylinder sleeve and said fluid supply conduit from flowing through said cylinder sleeve gap.

12. The manifold system as defined in claim 10, wherein a cylinder sleeve gap between said manifold housing and a bottom portion of said cylinder sleeve is less than 0.05 inches when said bottom portion of said cylinder sleeve is located in said first manifold cavity; a size of said cylinder sleeve gap results in less than 5% of said fluid flowing between said cylinder sleeve and said fluid supply conduit from flowing through said cylinder sleeve gap.

13. The manifold system as defined in claim 11, wherein said cylinder sleeve gap is absent a fluid seal.

14. The manifold system as defined in claim 12, wherein said cylinder sleeve gap is absent a fluid seal.

15. The manifold system as defined in claim 1, wherein flow of said non-solid lubricant into and out of said cylinder sleeve is caused by axial movement of said piston in said cylinder sleeve and without use of a fluid pump.

16. The manifold system as defined in claim 14, wherein flow of said non-solid lubricant into and out of said cylinder sleeve is caused by axial movement of said piston in said cylinder sleeve and without use of a fluid pump.

17. The manifold system as defined in claim 1, further including a second gas cylinder assembly; said gas cylinder including a cylinder sleeve supported in a second manifold cavity of said manifold housing and a piston; said cylinder sleeve forming an interior chamber wherein said piston axially moves between retracted and extended piston positions within said interior chamber; a bottom end of said cylinder sleeve spaced from said manifold housing to form a cylinder fluid gap; said cylinder fluid gap fluidly connected to said fluid supply conduit; said second gas cylinder assembly positioned adjacent to and spaced from said first gas cylinder assembly; and wherein said fluid reservoir is located remotely from said interior chamber of said cylinder sleeve of said second gas cylinder assembly; and wherein at least a portion of said atomized non-solid lubricant in said fluid supply conduit flows into said interior chamber of said cylinder sleeve of said second gas cylinder assembly via said fluid supply conduit as said piston moves toward a top end of said cylinder sleeve of said second gas cylinder; and wherein said atomized non-solid lubricant that flows into said cylinder sleeve of second gas cylinder assembly at least partially lubricates an inner surface of said interior chamber of said cylinder sleeve of second gas cylinder assembly.

18. The manifold system as defined in claim 16, further including a second gas cylinder assembly; said gas cylinder including a cylinder sleeve supported in a second manifold cavity of said manifold housing and a piston; said cylinder sleeve forming an interior chamber wherein said piston axially moves between retracted and extended piston positions within said interior chamber; a bottom end of said cylinder sleeve spaced from said manifold housing to form a cylinder fluid gap; said cylinder fluid gap fluidly connected to said fluid supply conduit; said second gas cylinder assembly positioned adjacent to and spaced from said first gas cylinder assembly; and wherein said fluid reservoir is located remotely from said interior chamber of said cylinder sleeve of said second gas cylinder assembly; and wherein at least a portion of said atomized non-solid lubricant in said fluid supply conduit flows into said interior chamber of said cylinder sleeve of said second gas cylinder assembly via said fluid supply conduit as said piston moves toward a top end of said cylinder sleeve of said second gas cylinder; and wherein said atomized non-solid lubricant that flows into said cylinder sleeve of second gas cylinder assembly at least partially lubricates an inner surface of said interior chamber of said cylinder sleeve of second gas cylinder assembly.

19. A method for lubrication of a cylinder assembly in a manifold system comprising:
providing a manifold housing;
providing a fluid reservoir that includes gas and non-solid lubricant;
providing a fluid supply conduit fluidly connected to said fluid reservoir;
providing a first gas cylinder assembly, said first gas cylinder assembly includes a cylinder sleeve supported in a first manifold cavity of said manifold housing and a piston; said cylinder sleeve forms an interior chamber wherein said piston axially moves between retracted and extended piston positions within said interior chamber; a bottom end of said cylinder sleeve is spaced from said manifold housing to form a cylinder fluid gap; said cylinder fluid gap fluidly connected to said fluid supply conduit; and
causing at least a portion of said non-solid lubricant in said fluid reservoir to become atomized in said fluid reservoir; and
causing at least a portion of said atomized non-solid lubricant in said fluid reservoir to flow from said fluid reservoir, through said fluid supply conduit, and into said cylinder sleeve; and
wherein said fluid reservoir is located remotely from said interior chamber of said cylinder sleeve of said first gas cylinder assembly; and
wherein said atomized non-solid lubricant that flows into said cylinder sleeve at least partially lubricates an inner surface of said interior chamber of said cylinder sleeve.

20. The method as defined in claim 19, wherein said piston includes a seal arrangement configured to inhibit fluid from flowing out a bottom end of said cylinder sleeve as said piston axially moves between said retracted and extended piston positions within said interior chamber.

21. The method as defined in claim 19, wherein said fluid reservoir is located in said manifold housing; said fluid reservoir is positioned relative to said cylinder sleeve such that at least a portion of said fluid reservoir is located between said top and bottom ends of said cylinder sleeve.

22. The method as defined in claim 20, wherein said fluid reservoir is located in said manifold housing; said fluid reservoir is positioned relative to said cylinder sleeve such that at least a portion of said fluid reservoir is located between said top and bottom ends of said cylinder sleeve.

23. The method as defined in claim 21, wherein at least 50% of said fluid reservoir is located between said top and bottom ends of said cylinder sleeve.

24. The method as defined in claim 22, wherein at least 50% of said fluid reservoir is located between said top and bottom ends of said cylinder sleeve.

25. The method as defined in claim 21, wherein 100% of said fluid reservoir is located between said top and bottom ends of said cylinder sleeve.

26. The method as defined in claim 22, wherein 100% of said fluid reservoir is located between said top and bottom ends of said cylinder sleeve.

27. The method as defined in claim 19, wherein a fluid level of said non-solid lubricant in said fluid reservoir prior to operation of said first gas cylinder assembly is below a top portion of said reservoir opening.

28. The method as defined in claim 26, wherein a fluid level of said non-solid lubricant in said fluid reservoir prior to operation of said first gas cylinder assembly is below a top portion of said reservoir opening.

29. The method as defined in claim 19, wherein a cylinder sleeve gap between said manifold housing and a bottom portion of said cylinder sleeve is less than 0.05 inches when said bottom portion of said cylinder sleeve is located in said first manifold cavity; a size of said cylinder sleeve gap results in less than 5% of said fluid flowing between said cylinder sleeve and said fluid supply conduit from flowing through said cylinder sleeve gap.

30. The method as defined in claim 28, wherein a cylinder sleeve gap between said manifold housing and a bottom portion of said cylinder sleeve is less than 0.05 inches when said bottom portion of said cylinder sleeve is located in said first manifold cavity; a size of said cylinder sleeve gap results in less than 5% of said fluid flowing between said cylinder sleeve and said fluid supply conduit from flowing through said cylinder sleeve gap.

31. The method as defined in claim 29, wherein said cylinder sleeve gap is absent a fluid seal.

32. The method as defined in claim 30, wherein said cylinder sleeve gap is absent a fluid seal.

33. The method as defined in claim 19, wherein flow of said non-solid lubricant into and out of said cylinder sleeve is caused by axial movement of said piston in said cylinder sleeve and without use of a fluid pump.

34. The method as defined in claim 32, wherein flow of said non-solid lubricant into and out of said cylinder sleeve is caused by axial movement of said piston in said cylinder sleeve and without use of a fluid pump.

35. The method as defined in claim 19, further including a second gas cylinder assembly; said second gas cylinder assembly is positioned adjacent to and spaced from said first gas cylinder assembly; said second gas cylinder includes a cylinder sleeve supported in a second manifold cavity of said manifold housing and a piston; said cylinder sleeve forms an interior chamber wherein said piston axially moves between retracted and extended piston positions within said interior chamber; a bottom end of said cylinder sleeve is spaced from said manifold housing to form a cylinder fluid gap; said cylinder fluid gap fluidly is connected to said fluid supply conduit; and
moving said piston in said cylinder sleeve of said second gas cylinder toward said bottom end of said cylinder sleeve and thereby causing at least a portion of gas in said cylinder sleeve to flow from said cylinder sleeve through said fluid supply conduit and into said fluid reservoir; and
moving said piston in said cylinder sleeve of said second gas cylinder toward said top end of said cylinder sleeve and thereby causing at least a portion of said atomized non-solid lubricant to flow from said fluid reservoir, through said fluid supply conduit and into said cylinder sleeve; and
wherein said fluid reservoir is located remotely from said interior chamber of said cylinder sleeve of said second gas cylinder assembly; and
wherein said atomized non-solid lubricant that flows into said cylinder sleeve of said second gas cylinder at least partially lubricates an inner surface of said interior chamber of said cylinder sleeve of said second gas cylinder.

36. The method as defined in claim 34, further including a second gas cylinder assembly; said second gas cylinder assembly is positioned adjacent to and spaced from said first gas cylinder assembly; said second gas cylinder includes a cylinder sleeve supported in a second manifold cavity of said manifold housing and a piston; said cylinder sleeve forms an interior chamber wherein said piston axially moves between retracted and extended piston positions within said interior chamber; a bottom end of said cylinder sleeve is spaced from said manifold housing to form a cylinder fluid gap; said cylinder fluid gap fluidly is connected to said fluid supply conduit; and
    moving said piston in said cylinder sleeve of said second gas cylinder toward said bottom end of said cylinder sleeve and thereby causing at least a portion of gas in said cylinder sleeve to flow from said cylinder sleeve through said fluid supply conduit and into said fluid reservoir; and
    moving said piston in said cylinder sleeve of said second gas cylinder toward said top end of said cylinder sleeve and thereby causing at least a portion of said atomized non-solid lubricant to flow from said fluid reservoir, through said fluid supply conduit and into said cylinder sleeve; and
    wherein said fluid reservoir is located remotely from said interior chamber of said cylinder sleeve of said second gas cylinder assembly; and
    wherein said atomized non-solid lubricant that flows into said cylinder sleeve of said second gas cylinder at least partially lubricates an inner surface of said interior chamber of said cylinder sleeve of said second gas cylinder.

37. A molding or stamping system comprising:
    a molding or stamping arrangement that is configured to cause a material to be molded, shaped, and/or stamped;
    a manifold system that includes a cylinder assembly; said cylinder assembly configured to move one or more components of said molding or stamping arrangement to cause the material to be molded, shaped, and/or stamped; said manifold system including
    a manifold housing;
    a fluid reservoir that includes gas and non-solid lubricant;
    a fluid supply conduit fluidly connected to said fluid reservoir;
    a first gas cylinder assembly including a cylinder sleeve supported in a first manifold cavity of said manifold housing and a piston; said cylinder sleeve forming an interior chamber wherein said piston axially moves between retracted and extended piston positions within said interior chamber; a bottom end of said cylinder sleeve spaced from said manifold housing to form a cylinder fluid gap; said cylinder fluid gap fluidly connected to said fluid supply conduit; and
    wherein said fluid reservoir is located remotely from said interior chamber of said cylinder sleeve of said first gas cylinder assembly; and
    wherein at least a portion of said non-solid lubricant is caused to be atomized in said fluid reservoir when said gas flows into said fluid reservoir and interacts with said non-solid lubricant in said fluid reservoir; and
    wherein at least a portion of said atomized non-solid lubricant in said fluid reservoir flows into said interior chamber of said cylinder sleeve via said fluid supply conduit as said piston moves toward a top end of said cylinder sleeve; and
    wherein said atomized non-solid lubricant that flows into said cylinder sleeve at least partially lubricates an inner surface of said interior chamber of said cylinder sleeve.

38. The molding or stamping system as defined in claim 37, wherein said piston includes a seal arrangement configured to inhibit fluid from flowing out a bottom end of said cylinder sleeve as said piston axially moves between said retracted and extended piston positions within said interior chamber.

39. The molding or stamping system as defined in claim 37, wherein said fluid reservoir is located in said manifold housing; said fluid reservoir is positioned relative to said cylinder sleeve such that at least a portion of said fluid reservoir is located between said top and bottom ends of said cylinder sleeve.

40. The molding or stamping system as defined in claim 38, wherein said fluid reservoir is located in said manifold housing; said fluid reservoir is positioned relative to said cylinder sleeve such that at least a portion of said fluid reservoir is located between said top and bottom ends of said cylinder sleeve.

41. The molding or stamping system as defined in claim 39, wherein at least 50% of said fluid reservoir is located between said top and bottom ends of said cylinder sleeve.

42. The molding or stamping system as defined in claim 40, wherein at least 50% of said fluid reservoir is located between said top and bottom ends of said cylinder sleeve.

43. The molding or stamping system as defined in claim 39, wherein 100% of said fluid reservoir is located between said top and bottom ends of said cylinder sleeve.

44. The molding or stamping system as defined in claim 40, wherein 100% of said fluid reservoir is located between said top and bottom ends of said cylinder sleeve.

45. The molding or stamping system as defined in claim 37, wherein a fluid level of said non-solid lubricant in said fluid reservoir prior to operation of said first gas cylinder assembly is below a top portion of said reservoir opening.

46. The molding or stamping system as defined in claim 44, wherein a fluid level of said non-solid lubricant in said fluid reservoir prior to operation of said first gas cylinder assembly is below a top portion of said reservoir opening.

47. The molding or stamping system as defined in claim 37, wherein a cylinder sleeve gap between said manifold housing and a bottom portion of said cylinder sleeve is less than 0.05 inches when said bottom portion of said cylinder sleeve is located in said first manifold cavity; a size of said cylinder sleeve gap results in less than 5% of said fluid flowing between said cylinder sleeve and said fluid supply conduit from flowing through said cylinder sleeve gap.

48. The molding or stamping system as defined in claim 46, wherein a cylinder sleeve gap between said manifold housing and a bottom portion of said cylinder sleeve is less than 0.05 inches when said bottom portion of said cylinder sleeve is located in said first manifold cavity; a size of said cylinder sleeve gap results in less than 5% of said fluid flowing between said cylinder sleeve and said fluid supply conduit from flowing through said cylinder sleeve gap.

49. The molding or stamping system as defined in claim 47, wherein said cylinder sleeve gap is absent a fluid seal.

50. The molding or stamping system as defined in claim 48, wherein said cylinder sleeve gap is absent a fluid seal.

51. The molding or stamping system as defined in claim 37, wherein flow of said non-solid lubricant into and out of said cylinder sleeve is caused by axial movement of said piston in said cylinder sleeve and without use of a fluid pump.

52. The molding or stamping system as defined in claim 50, wherein flow of said non-solid lubricant into and out of said cylinder sleeve is caused by axial movement of said piston in said cylinder sleeve and without use of a fluid pump.

53. The molding or stamping system as defined in claim 37, further including a second gas cylinder assembly; said second gas cylinder assembly is positioned adjacent to and spaced from said first gas cylinder assembly; said second gas cylinder includes a cylinder sleeve supported in a second manifold cavity of said manifold housing and a piston; said cylinder sleeve forms an interior chamber wherein said piston axially moves between retracted and extended piston positions within said interior chamber; a bottom end of said cylinder sleeve is spaced from said manifold housing to form a cylinder fluid gap; said cylinder fluid gap fluidly is connected to said fluid supply conduit; and moving said piston in said cylinder sleeve of said second gas cylinder toward said bottom end of said cylinder sleeve and thereby causing at least a portion of gas in said cylinder sleeve to flow from said cylinder sleeve through said fluid supply conduit and into said fluid reservoir; and moving said piston in said cylinder sleeve of said second gas cylinder toward said top end of said cylinder sleeve and thereby causing at least a portion of said atomized non-solid lubricant to flow from said fluid reservoir, through said fluid supply conduit and into said cylinder sleeve; and wherein said fluid reservoir is located remotely from said interior chamber of said cylinder sleeve of said second gas cylinder assembly; and wherein said atomized non-solid lubricant that flows into said cylinder sleeve of said second gas cylinder at least partially lubricates an inner surface of said interior chamber of said cylinder sleeve of said second gas cylinder.

54. The molding or stamping system as defined in claim 52, further including a second gas cylinder assembly; said second gas cylinder assembly is positioned adjacent to and spaced from said first gas cylinder assembly; said second gas cylinder includes a cylinder sleeve supported in a second manifold cavity of said manifold housing and a piston; said cylinder sleeve forms an interior chamber wherein said piston axially moves between retracted and extended piston positions within said interior chamber; a bottom end of said cylinder sleeve is spaced from said manifold housing to form a cylinder fluid gap; said cylinder fluid gap fluidly is connected to said fluid supply conduit; and moving said piston in said cylinder sleeve of said second gas cylinder toward said bottom end of said cylinder sleeve and thereby causing at least a portion of gas in said cylinder sleeve to flow from said cylinder sleeve through said fluid supply conduit and into said fluid reservoir; and moving said piston in said cylinder sleeve of said second gas cylinder toward said top end of said cylinder sleeve and thereby causing at least a portion of said atomized non-solid lubricant to flow from said fluid reservoir, through said fluid supply conduit and into said cylinder sleeve; and wherein said fluid reservoir is located remotely from said interior chamber of said cylinder sleeve of said second gas cylinder assembly; and wherein said atomized non-solid lubricant that flows into said cylinder sleeve of said second gas cylinder at least partially lubricates an inner surface of said interior chamber of said cylinder sleeve of said second gas cylinder.

\* \* \* \* \*